United States Patent [19]

Kimura

[11] Patent Number: 4,645,653
[45] Date of Patent: * Feb. 24, 1987

[54] METHOD FOR DRY FLUE GAS DESULFURIZATION INCORPORATING NITROGEN OXIDES REMOVAL

[75] Inventor: Shiro G. Kimura, Schenectady, N.Y.

[73] Assignee: General Electric Company, Schenectady, N.Y.

[*] Notice: The portion of the term of this patent subsequent to Feb. 24, 2004 has been disclaimed.

[21] Appl. No.: 802,897

[22] Filed: Nov. 29, 1985

[51] Int. Cl.$^4$ .............. C01B 21/00; C01B 17/00; B01J 8/00
[52] U.S. Cl. ............................ 423/235; 423/239; 423/242; 423/244
[58] Field of Search ............ 423/235, 235 D, 239, 423/244 A, 244 R, 242 A, 242 R

[56] References Cited

U.S. PATENT DOCUMENTS

| | | | |
|---|---|---|---|
| 3,411,864 | 11/1968 | Pallinger | 423/244 |
| 4,081,513 | 3/1978 | Moss | 423/244 |
| 4,309,393 | 1/1982 | Nguyen | 423/244 |
| 4,324,770 | 4/1982 | Bakke | 423/244 |

OTHER PUBLICATIONS

"Acid Rain Prevention Thru New $SO_x/NO_x$ Dry Scrubbing Process" by Karston Felsvang & Per Morsing presented at the EPA/EPRI Symposium on Flue Gas Desulfurization, New Orleans, La., Nov. 1–4, 1983, Paper #10B.

"Overview and Evaluation of Two Years of Operation and Testing of the Riverside Spray Dryer System" by John M. Gutske, Wayne E. Morgan & Steven H. Wolf presented at EPA/EPRI Symposium on Flue Gas Desulfurization, New Orleans, La., Nov. 1–4, 1983, Paper No. 10G.

"Design and Initial Operation of the Spray Dry FGD System at the Marquette Michigan Board of Light and Power Shiras #3 Plant by O. Fortune, T. F. Bechtel, E. Puska and J. Arello, presented at the EPA/EPRI Symposium on Flue Gas Desulfurization, New Orleans, La., Nov. 1–4, 1983, Paper #10H.

*Primary Examiner*—Gregory A. Heller
*Attorney, Agent, or Firm*—William H. Steinberg; James C. Davis, Jr.; Paul R. Webb, II

[57] ABSTRACT

Dry recycle sorbent from a spray dry flue gas desulfurization system is fed into flue gas ducting upstream from a spray absorber to remove NO from the flue gas stream. The high temperature and high $SO_2$ content of the flue gas upstream of the absorber enhance NO removal rates.

4 Claims, 5 Drawing Figures

METHOD FOR DRY FLUE GAS DESULFURIZATION INCORPORATING NITROGEN OXIDES REMOVAL

This application is related to my application Ser. No. (802,926), filed on even date herewith and assigned to the instant assignee.

BACKGROUND OF THE INVENTION

The present invention relates to a dry flue gas desulfurization process also called a spray dry flue gas desulfurization process, incorporating nitrogen oxides removal.

The major contributors to acid rain are sulfur oxides, $SO_x$, and nitrogen oxides, $NO_x$. Sulfur oxides ($SO_x$) as an air pollutant, include sulfur dioxide ($SO_2$), sulfur trioxide ($SO_3$), plus the corresponding acids ($H_2SO_3$ and $H_2SO_4$) and salts (sulfites and sulfates). Nitrogen oxides ($NO_x$) in air pollution terminology refer to two gaseous oxides of nitrogen, nitrogen dioxide ($NO_2$) and nitric oxide (NO). The predominant species in flue gas are $SO_2$ and NO. $SO_x$ can generally be controlled reasonably well by flue gas desulfurization processes. Dry Flue Gas Desulfurization (DFGD), also called Spray Dry Flue Gas Desulfurization (SDFGD), is a sulfur dioxide scrubbing process in which lime slurries, or alternatively, sorbent solutions containing sodium compounds such as sodium bicarbonate, are contacted with flue gas in a device such as a spray dryer, in which the sulfur dioxide reacts with the sorbent material, and the water simultaneously evaporates. The resulting product is a dry mixture of $CaSO_4$, $CaSO_3$ unreacted sorbent, and flyash. A particulate removal device such as a baghouse located downstream from the spray absorber removes entrained particulates which are not removed in the absorber vessel.

It is expected that acid rain regulation will require the scrubbing of nitrogen oxides as well as sulfur oxides. Conventionally operated SDGFD systems do not remove $NO_x$ except for perhaps a small percentage in the baghouse. $NO_x$ control is not easily accomplished without the addition of expensive processes such as selective catalytic reduction. Proposed targets for stack gas cleanup are 90% $SO_x$/ 90% $NO_x$ and 50% $SO_x$/ 50% $NO_x$ for new and retrofit applications, respectively.

Niro Atomizer in a paper by Felsvang et al., describes an approach for operating SDFGD processes in which the absorber exit temperature is increased by about 50° F., so that the temperature entering the baghouse is about 195°–215° F., rather than the normal 150°–160° F. This results in $NO_x$ removal in the baghouse, but other undesirable process alterations are necessary. In order to maintain high $SO_2$ removal, it is necessary to increase the temperature entering the absorber, which is undesirable from a plant efficiency standpoint. Sodium compounds such as NaOH are added to the sorbent to increase its scrubbing effectiveness, but this is undesirable due to the high cost of NaOH and the fact that the wastes will be leachable resulting in additional land fill disposal expense.

It is an object of the present invention to provide a low cost $SO_x$/$NO_x$ scrubbing system.

It is a further object of the present invention to provide a method for removing $NO_x$ from flue gas streams in spray dry flue gas desulfurization type processes.

SUMMARY OF THE INVENTION

In one aspect of the present invention, a method of removing sulfur oxides and nitrogen oxides from flue gas is provided. Recycled powder comprising unreacted alkali reagent, products of reaction of the reagent with flue gas, and flyash from the boiler is dispersed in a stream of flue gas from a boiler to remove nitrogen oxides. The powder is introduced far enough upstream from the absorber, typically 10 to 100 feet, to achieve good dispersion of the powder and adequate residence time for the $NO_x$ removal reactions to occur. Alkali reagent slurry and a slurry of recycled powder are atomized in a spray absorber. Flue gas with nitrogen oxides removed, is mixed with the alkali reagent slurry and recycled slurry in the spray absorber to remove sulfur oxides. A portion of the dry particulates comprising unreacted reagent and products of the reagent with flue gas is removed in the spray absorber. The flue gas stream from the spray absorber is directed through a particulate collector to remove the residual particulates and continuously return a portion of the captured particulate as recycled powder. The remaining particulate is disposed.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

DETAILED DESCRIPTION OF THE INVENTION

Figure 1:
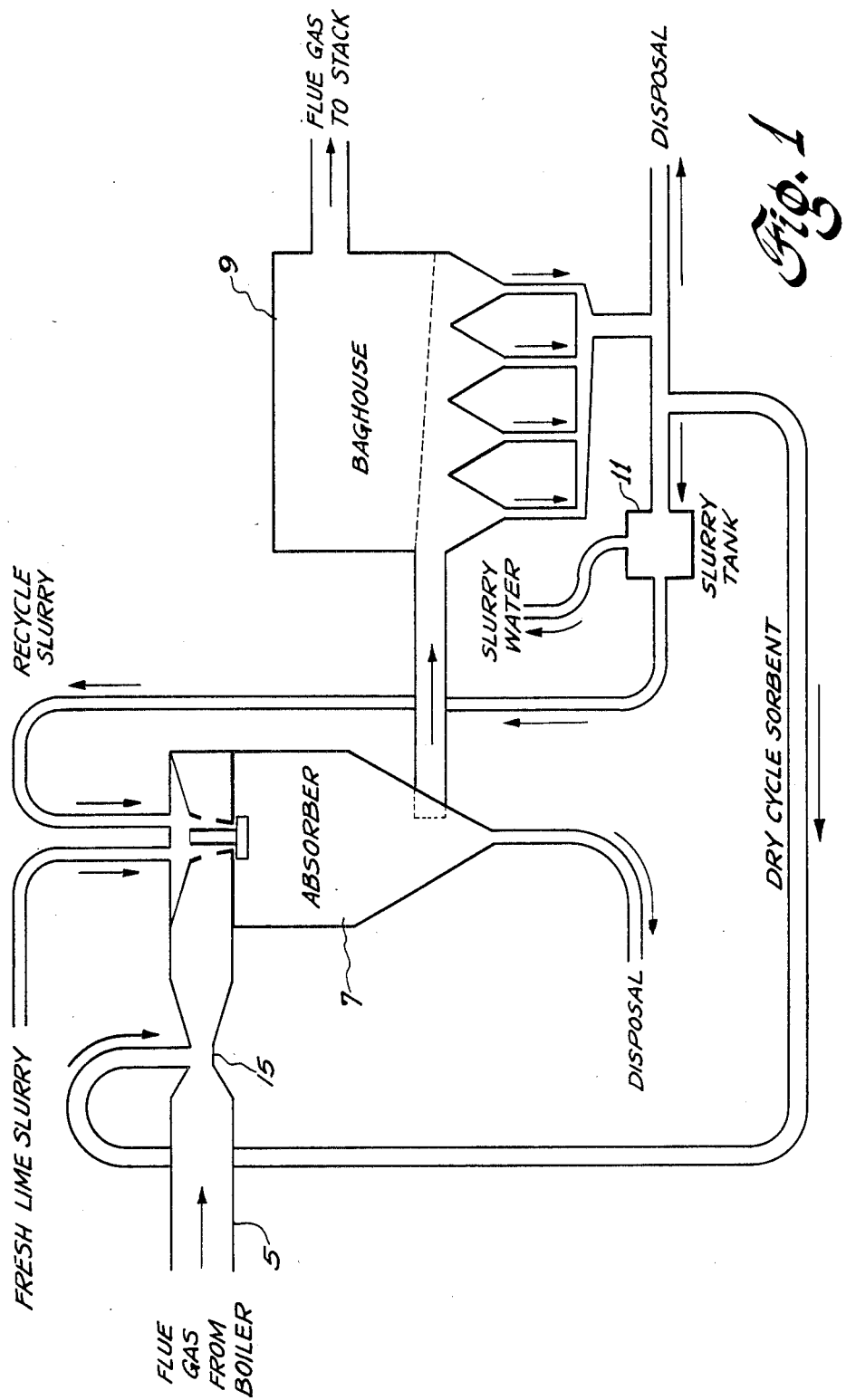
FIG. 1 is a process flow diagram of a spray dry flue gas desulfurization system with nitrogen oxides removal in accordance with the present invention.

Referring now to the drawing and particularly FIG. 1 thereof, flue gas from a boiler, such as a coal fuel fired boiler with air preheater, is coupled through a duct 5 to a spray absorber 7, where reagent (lime slurry) and recycled slurry are atomized into fine droplets and mix with the incoming flue gas, the temperature of which is typically 250° to 400° F. In the spray absorber 7, $SO_2$ reacts with the alkaline sorbent while water is simultaneously evaporated. The resultant dry solid particulate which comprises partially spent sorbent and flyash are collected in a settling chamber or cyclone in the absorber. The flue gas exits the absorber and is coupled to a fabric filter particulate collector 9 (baghouse) where in addition to removing particulates, some $SO_2$ is also removed. Alternatively, an electrostatic precipitator (not shown) could be used to collect particles. The flue gas after passing through the baghouse goes to an exhaust stack. Part of the solid waste from the baghouse and/or from the absorber is sent to a slurry tank 11 coupled to a supply of water for recycling, to enhance sorbent utilization. The recycled slurry is provided to the spray absorber 7. A portion of the solid waste from the absorber and/or the baghouse is recycled and is injected in dry form into the flue gas stream flowing in the ductwork 5 from the boiler to the absorber to remove $NO_x$. A venturi 15 can be used to achieve good dispersion of recycle material in the duct. Alternatively, the gas-solid contact may be performed in a mixing chamber such as a cyclone (not shown) or dry absorber vessel (not shown). The recycled solid waste is preferably obtained from the baghouse or electrostatic precipitator since it will have a small particle size and have a relatively high lime to flyash ratio.

Figure 2A:
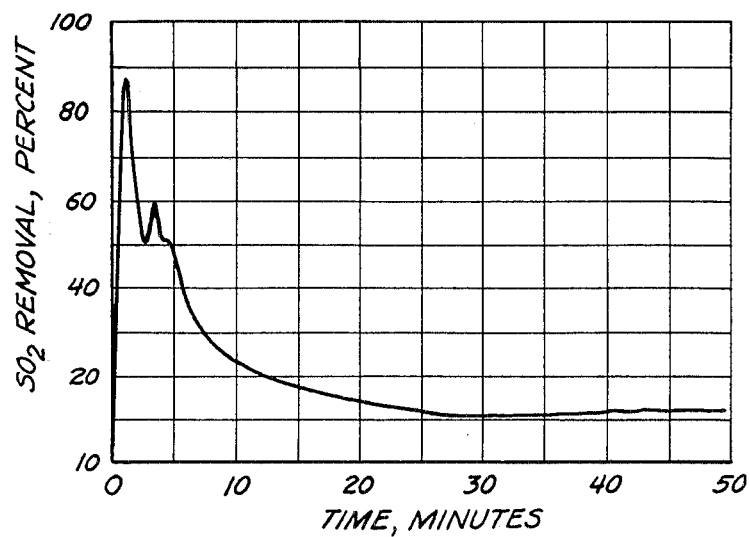
FIGS. 2A and B are graphs showing experimental data from a fluidized bed dry gas lab setup for $SO_2$ removal and NO removal, respectively.
Figure 2B:
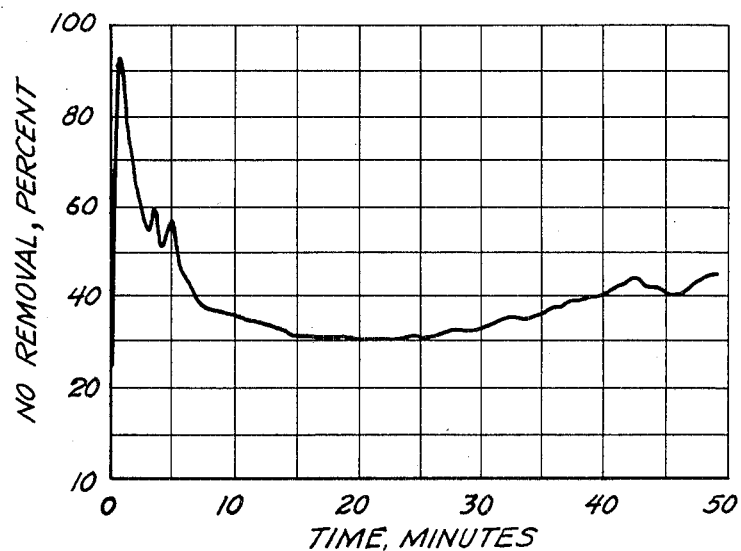

Laboratory experiments were performed to determine the effectiveness of dry recycle sorbent in the removal of NO. Removal effectiveness was measured in a fluid bed of dry baghouse solids from the Shiras #3 unit of the Marquette, Michigan Board of Light and Power facility. Conditions typical of flue gas exiting an air preheater and entering a spray dry FGD absorber were used. The temperature was 150° C. (302° F.), $SO_2$ concentration was 3000 ppm, NO was 500 ppm, $CO_2$ was 12%, oxygen was 5%, some water was added for humidification, and the balance was nitrogen. A 2-inch diameter bed with a fluidized depth of 1 to 2 inches of dry baghouse solids was used. The simulated flue gas flow rate was typically 87 cc/sec, and the weight of baghouse solids was 60 grams. FIGS. 2A and 2B show the $SO_2$ and NO removal, respectively, for the fluidized bed operating under these conditions. Because the bed is operated in a batch mode, removal efficiency decreases with time. It is noteworthy that NO removals as high as 80% with a steady value of about 60% were achieved. $SO_2$ removals ranging from 35% to 70% were achieved.

Figure 3A:
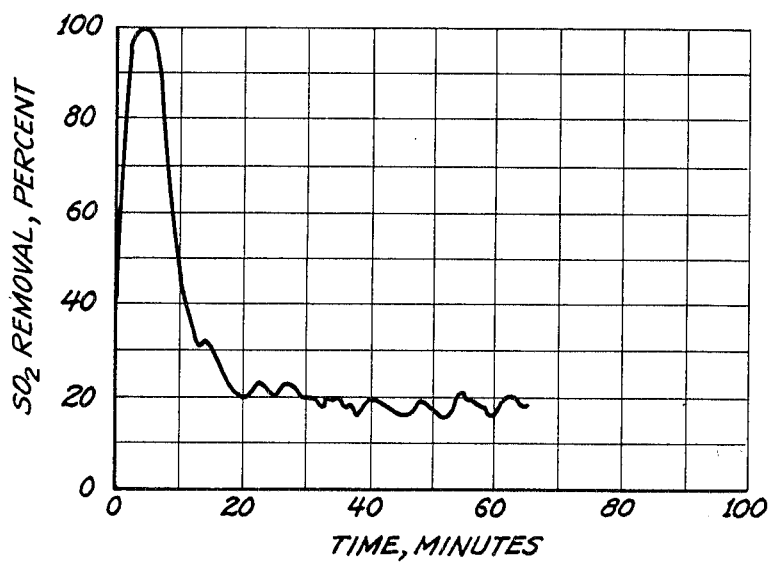
FIGS. 3A and B are graphs showing experimental data from a fixed bed humidified gas lab setup for $SO_2$ removal and NO removal, respectively.
Figure 3B:
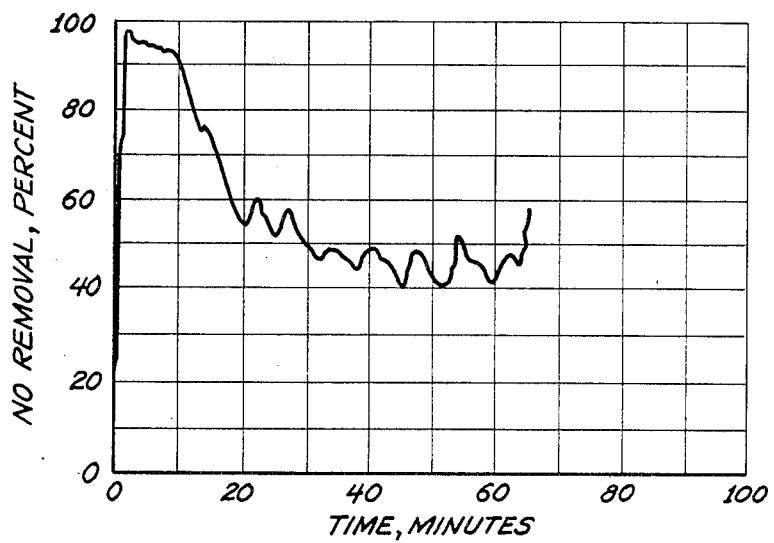

Laboratory fixed bed experiments were also performed for a range of temperatures and using the Marquette baghouse solids as well as simulated recycle sorbent material. In these experiments, bed depths of ¼ to ½-inch and simulated flue gas flow rates of 60 to 90 cc/sec were used, giving residence times for the gas to be in contact with the solid sorbent of from 0.7 to 1 second. FIGS. 3A and 3B show $SO_2$ and NO removal at 150° C. for the simulated flue gas composition previously described. After an initially high value, NO removal ranges from 40 to 60%. The steady $SO_2$ removal efficiency is about 20%. When the temperature was lowered to 100° C. and the $SO_2$ and NO concentrations reduced to 300 ppm, NO removal efficiencies were in the range of 20 to 25%. At 70° C. NO removal further declined to about 10 to 20%. Reduction of the $SO_2$ concentration to 100 ppm resulted in the decline of NO removal to below 10%. We also found that at temperatures of less than 100° C., the presence of water resulted in a decline in NO removal efficiency, whereas at 150° C., water seemed to have no effect.

From the above experiments it was determined that NO removal is favored by high temperature, high $SO_2$ concentration, and low humidity. Conditions for highest NO removal exist upstream of the spray dry $SO_2$ absorber.

Thus, effective NO removal can be achieved by dry recycle sorbent injection into the flue gas stream prior to its entry into the $SO_2$ absorber. The previously discussed experiments also show that residence times in the NO removal section can be about 1 second or less.

The foregoing describes a low cost method for removing $NO_x$ from flue gas streams in spray dry flue gas desulfurization type processes.

While the invention has been particularly shown and described with reference to a preferred embodiment thereof, it will be understood by those skilled in the art that various changes in the form and details may be made without departing from the spirit and scope of the invention.

What is claimed is:

1. A process of removing nitrogen oxides and sulfur oxides from flue gas in a dry flue gas desulfurization process comprising the steps of:
   contacting flue gas from a boiler with a dry alkaline powder prior to the flue gas entering a spray absorber; to remove nitrogen oxides
   removing sulfur oxides from the flue gas stream containing the dry alkaline powder in a spray absorber;
   collecting dry particulate from the spray absorber; and
   directing the flue gas stream from the spray absorber through a particulate collector to remove the residual particulate.

2. The process in claim 1 wherein the alkali power comprises lime.

3. The process of claim 1 wherein the dry alkali power comprises dry particulate collected by the particulate collector.

4. The process of claim 1 wherein the dry alkali reagent comprises dry particulate collected from the spray absorber.

* * * * *